US012572012B2

(12) United States Patent     (10) Patent No.: US 12,572,012 B2
Kobayashi et al.                 (45) Date of Patent: Mar. 10, 2026

(54) CIRCUIT DEVICE AND HEAD-UP DISPLAY APPARATUS

(71) Applicant: SEIKO EPSON CORPORATION, Tokyo (JP)

(72) Inventors: Daisuke Kobayashi, Chino (JP); Yasutoshi Akiba, Chino (JP); Kumar Anandabairavasamy Anand, Richmond (CA); Sebdani Mahmood Mazrouei, Markham (CA)

(73) Assignee: SEIKO EPSON CORPORATION (JP)

( * ) Notice: Subject to any disclaimer, the term of this patent is extended or adjusted under 35 U.S.C. 154(b) by 538 days.

(21) Appl. No.: 17/974,822

(22) Filed: Oct. 27, 2022

(65) Prior Publication Data

US 2023/0140248 A1     May 4, 2023

(30) Foreign Application Priority Data

Oct. 28, 2021     (JP) ................................. 2021-176092

(51) Int. Cl.
  *G02B 27/01*          (2006.01)
(52) U.S. Cl.
  CPC .... *G02B 27/0101* (2013.01); *G02B 2027/011* (2013.01); *G02B 2027/014* (2013.01)
(58) Field of Classification Search
  CPC .......... H04N 9/3185; G02B 2027/0105–0198; G02B 27/01–0189
  See application file for complete search history.

(56) References Cited

U.S. PATENT DOCUMENTS

| | | | |
|---|---|---|---|
| 2008/0088526 A1 | 4/2008 | Kadantseva et al. | |
| 2018/0203226 A1 | 7/2018 | Tomioka | |
| 2019/0005607 A1* | 1/2019 | Tamai | G03B 21/14 |
| 2019/0005608 A1 | 1/2019 | Bayerl et al. | |
| 2019/0011712 A1* | 1/2019 | Nagano | G09G 5/38 |
| 2019/0013826 A1 | 1/2019 | Kikuta et al. | |
| 2019/0266711 A1 | 8/2019 | Anand et al. | |
| 2020/0201035 A1 | 6/2020 | Anand et al. | |

(Continued)

FOREIGN PATENT DOCUMENTS

| | | | |
|---|---|---|---|
| JP | 2008-108251 A | 5/2008 | |
| JP | 2016-224481 A | 12/2016 | |

(Continued)

*Primary Examiner* — Christopher A Lamb, II
(74) *Attorney, Agent, or Firm* — Harness, Dickey & Pierce, P.L.C.

(57)          ABSTRACT

A circuit device is used for a head-up display apparatus. The circuit device includes a distortion correction circuit and an error detection circuit. The distortion correction circuit performs a distortion correction on input image data as image data of an input image and outputs output image data as image data of an output image after the distortion correction. Respective first divisional areas of a first divisional area group formed by division of the input image correspond to respective second divisional areas of a second divisional area group in the output image in the distortion correction. Here, the error detection circuit performs detection of a distortion correction error of the respective second divisional areas by comparing the input image data of the respective first divisional areas to the output image data of the respective second divisional areas.

8 Claims, 10 Drawing Sheets

(56) References Cited

U.S. PATENT DOCUMENTS

| | | | |
|---|---|---|---|
| 2020/0221057 A1 | 7/2020 | Shimoda et al. | |
| 2021/0019867 A1 | 1/2021 | Hayashi et al. | |
| 2021/0304372 A1* | 9/2021 | Imatoh ...................... | G06T 5/80 |
| 2023/0086164 A1 | 3/2023 | Hayashi et al. | |

FOREIGN PATENT DOCUMENTS

| | | | |
|---|---|---|---|
| JP | 2017-035980 | A | 2/2017 |
| JP | 2017-111219 | A | 6/2017 |
| JP | 2019-149760 | A | 9/2019 |
| JP | 2019-179214 | A | 10/2019 |
| JP | 2020-101784 | A | 7/2020 |
| WO | 2019-058645 | A1 | 3/2019 |
| WO | 2021-002429 | A1 | 1/2021 |

* cited by examiner

FIG. 1

CIRCUIT DEVICE                                    PROCESSING DEVICE

OUTPUT IMAGE                                      INPUT IMAGE

CIRCUIT DEVICE                                    BACKLIGHT DEVICE

OUTPUT IMAGE                          LIGHT EMITTING ELEMENT ARRAY

CIRCUIT DEVICE AND HEAD-UP DISPLAY APPARATUS

The present application is based on, and claims priority from JP Application Serial Number 2021-176092, filed Oct. 28, 2021, the disclosure of which is hereby incorporated by reference herein in its entirety.

BACKGROUND

1. Technical Field

The present disclosure relates to a circuit device, a head-up display apparatus, etc.

2. Related Art

JP-A-2020-101784 discloses a circuit device used for a head-up display. The circuit device includes an error detection circuit and a processing circuit. The error detection circuit detects an occurrence of a first glare error when a glare index value obtained from head-up display image data exceeds a first threshold. The processing circuit performs processing for the first glare error when the occurrence of the first glare error is detected.

In a head-up display, a distortion correction to provide reverse distortion to image distortion at projection to an image is performed and an undistorted image is projected. When it is desired to detect a processing error of the distortion correction, if common error detection for the entire screen of the head-up display is performed, there is a problem that only the common processing for dealing with an error for the entire screen can be performed. The above mentioned JP-A-2020-101784 is an example of glare detection, and a glare index value is obtained from image data of the entire screen and an occurrence of a first glare error is detected based on the glare index value. That is, common glare detection for the entire screen of the head-up display is performed and there is a problem that only the common processing for dealing with an error for the entire screen can be performed.

SUMMARY

An aspect of the present disclosure relates to a circuit device used for a head-up display apparatus, including a distortion correction circuit performing a distortion correction on input image data as image data of an input image and outputting output image data as image data of an output image after the distortion correction, and an error detection circuit, when respective first divisional areas of a first divisional area group formed by division of the input image correspond to respective second divisional areas of a second divisional area group in the output image in the distortion correction, performing detection of a distortion correction error of the respective second divisional areas by comparing the input image data of the respective first divisional areas to the output image data of the respective second divisional areas.

Another aspect of the present disclosure relates to a head-up display apparatus including the above described circuit device, a processing device controlling the circuit device, and a display device projecting a display image based on the output image data from the circuit device.

BRIEF DESCRIPTION OF THE DRAWINGS

FIG. 1 shows a display example of an HUD.

DESCRIPTION OF EXEMPLARY EMBODIMENTS

As below, preferred embodiments of the present disclosure will be explained in detail. The following embodiments do not unduly limit the details described in the appended claims and not all configurations described in the embodiments are essential component elements.

1. First Configuration Example of Display System and Circuit Device

Figure 1:
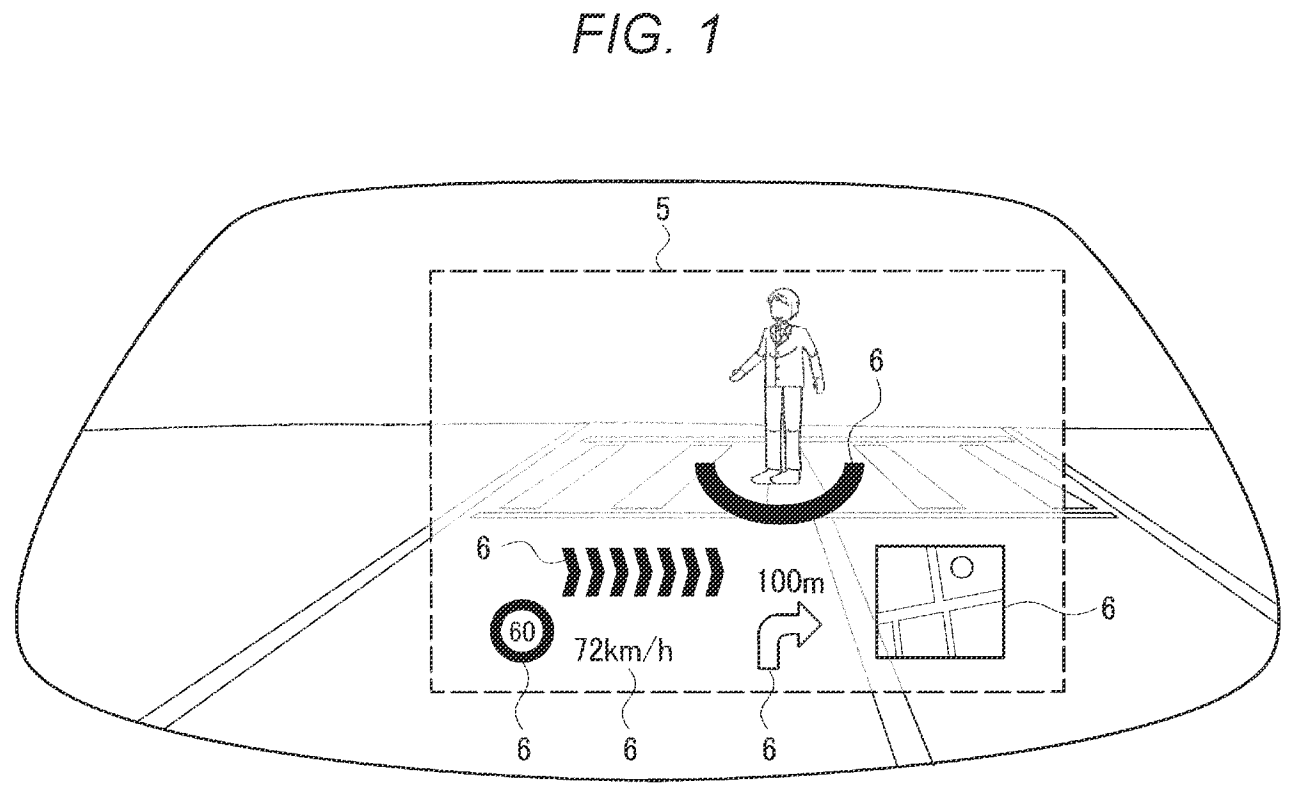

FIG. 1 shows a display example of an HUD. HUD is an abbreviation for head-up display. As below, a head-up display may be appropriately abbreviated as an HUD.

The HUD includes a liquid crystal panel, a backlight device, and a reflection plate. The backlight device outputs light, the light transmitted through the liquid crystal panel is reflected toward a screen by the reflection plate, and the light reflected by the screen enters eyes of a user. Thereby, virtual display objects 6 corresponding to display objects displayed on the liquid crystal panel are projected in the field of view of the user. The virtual display objects 6 overlap with a real space as the background of HUD display. Within a display area 5 of the HUD, an area where the virtual display objects 6 are not displayed is an area in a transparent color without any display since it is in a non-transmissive state in the liquid crystal panel, and the background is seen as it is.

As described above, the distortion correction is performed in image processing of the HUD. When a processing error occurs in the distortion correction, a display object having a different shape, size, or color from that of the display object 6 supposed to be displayed may be displayed or the display object 6 supposed to be displayed may not be displayed. Accordingly, in the embodiment, a circuit device used for the HUD detects an error of the distortion correction. Here, it is desirable that a portion with an error in the distortion correction processing is detectable within the display area 5 of the HUD. As an example, processing of dealing with an error of setting the HUD display to be transparent when the error occurs is considered, however, in view of continuation of information presentation to the user, it is desirable that the HUD display is maintained as much as possible. When the portion with an error in the distortion correction processing is detectable, the HUD display of the entire screen is not set to be transparent, but the HUD display of only the portion with the error may be set to be transparent and the HUD display of other portions may be maintained.

Figure 2:
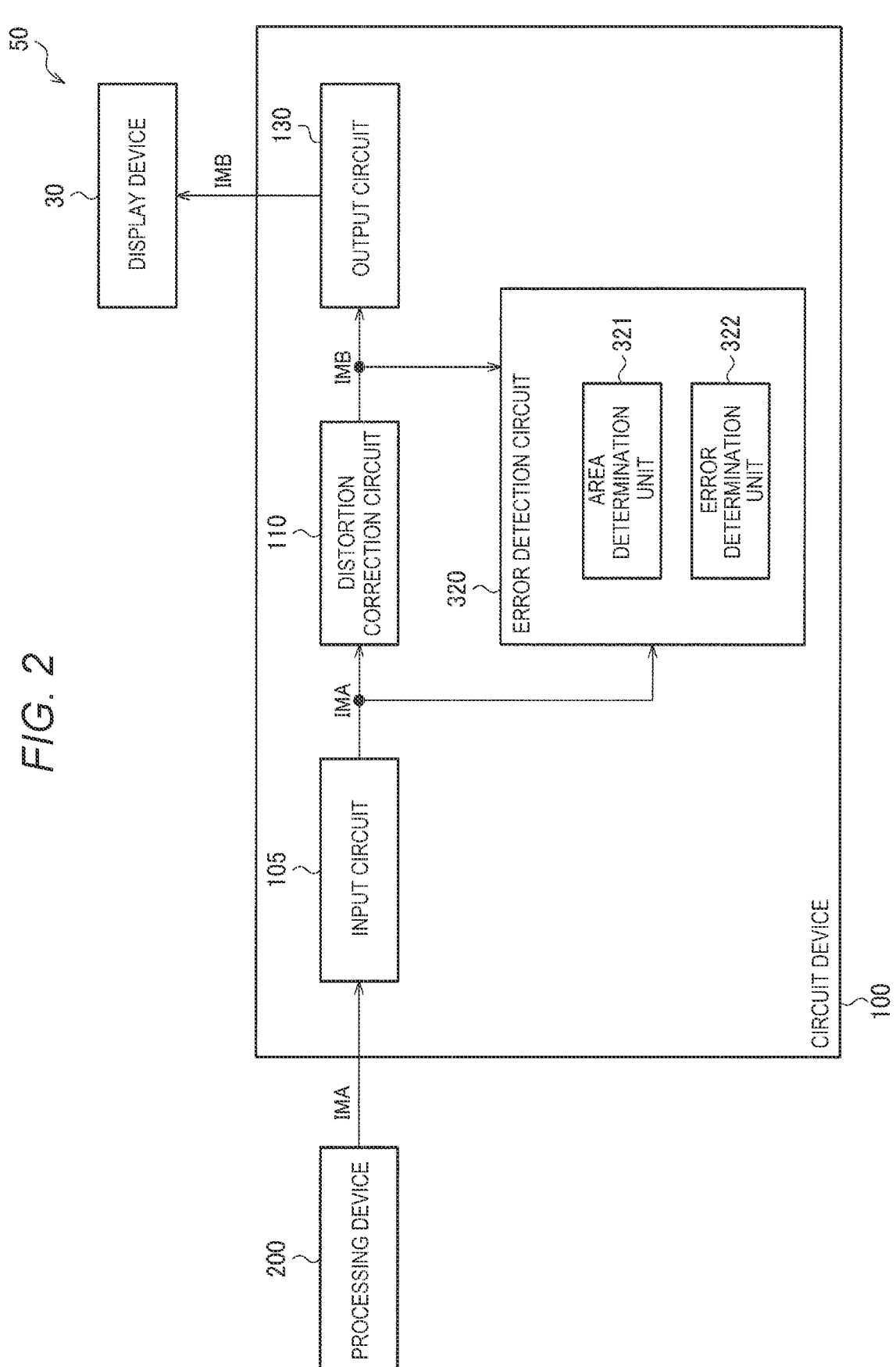
FIG. 2 shows a configuration example of a head-up display apparatus and a circuit device.

FIG. 2 shows a configuration example of a head-up display apparatus 50 and a circuit device 100 used for the head-up display apparatus 50 in the embodiment. The head-up display apparatus 50 includes a display device 30, the circuit device 100, and a processing device 200.

The processing device 200 transmits input image data IMA as image data of an input image to the circuit device 100. The processing device 200 is the so-called SoC e.g. a processor such as a CPU or a microcomputer. SoC is an abbreviation for System on Chip. CPU is an abbreviation for Central Processing Unit.

The circuit device 100 includes an input circuit 105, a distortion correction circuit 110, an error detection circuit 320, and an output circuit 130. The circuit device 100 is e.g. an integrated circuit device in which a plurality of circuit elements are integrated on a semiconductor substrate.

The input circuit 105 receives the input image data IMA from the processing device 200. The input circuit 105 may be a receiving circuit of various communication interfaces and, as an example, a receiving circuit of LVDS, DVI, display port, GMSL, or GVIF. LVDS is an abbreviation for Low voltage differential signaling, DVI is an abbreviation for Digital Visual Interface, GMSL is an abbreviation for Gigabit Multimedia Serial Link, and GVIF is an abbreviation for Gigabit Video InterFace.

The distortion correction circuit 110 performs a distortion correction on the input image data IMA using coordinate transformation between pixel coordinates in the input image data IMA and pixel coordinates in output image data IMB and outputs a result thereof as the output image data IMB as image data of an output image. The distortion correction is an image correction to form HUD display with no or reduced distortion by providing reverse image distortion to image distortion when an image displayed on a display panel is projected on the image. The image distortion by projection includes one or both of image distortion due to a curved surface of the screen and image distortion due to an HUD optical system.

The distortion correction circuit 110 corresponds to a reverse warp engine or a forward warp engine. Reverse warp is warp processing of coordinate-transforming the pixel coordinates on the output image data IMB into reference coordinates corresponding thereto and obtaining pixel data of the output image data IMB from pixel data of the input image data IMA at the reference coordinates. Forward warp is warp processing of coordinate-transforming the pixel coordinates on the input image data IMA to movement destination coordinates corresponding thereto and obtaining pixel data of the output image data IMB at the movement destination coordinates from pixel data of the input image data IMA at the pixel coordinates. The coordinate transformations in the reverse warp and the forward warp are defined by warp parameters. The warp parameters are a table in which coordinates on the input image data IMA are correlated with coordinates on the output image data IMB, a table showing amounts of movement between the coordinates on the input image data IMA and the coordinates on the output image data IMB, coefficients of a polynomial correlating the coordinates on the input image data IMA with the coordinates on the output image data IMB, or the like.

Note that the distortion correction circuit 110 and the error detection circuit 320 are logic circuits. The respective distortion correction circuit 110 and error detection circuit 320 may be formed as individual circuits or the distortion correction circuit 110 and the error detection circuit 320 may be formed as an integrated circuit by automatic placement and routing or the like. Alternatively, part or all of these logic circuits may be realized by a processor such as a DSP. DSP is an abbreviation for Digital Signal Processor. In this case, programs and command sets in which functions of the respective circuits are described are stored in a memory, and the programs and command sets are executed by the processor and the functions of the respective circuits are realized.

The output circuit 130 transmits the output image data IMB to the display device 30. The output circuit 130 may be a transmitting circuit of various communication interfaces and, as an example, a transmitting circuit of LVDS, DVI, display port, GMSL, or GVIF.

The display device 30 displays a virtual image in the field of view of the user based on the output image data IMB received from the circuit device 100. The display device 30 includes a display controller, a display driver, an image display device, and an optical system. Note that the configuration of the display device 30 is not limited to that, but the circuit device 100 may have a function of the display controller, for example.

The display controller performs image data transmission to the display driver and display timing control based on the received output image data IMB. The display driver drives the image display device based on the image data from the display controller and the display timing control, and the image display device displays an image corresponding to the output image data IMB. The optical system includes a reflection plate etc. and projects the image displayed by the image display device on the screen. The screen may be a transparent member on which an image is projected having a projection surface reflecting the projected light. For example, the screen is a windscreen of a moving body on which the HUD is mounted. The image display device includes e.g. a liquid crystal display panel and a backlight device. Alternatively, the image display device may include a laser source, a mirror reflecting a laser, and an actuator driving the mirror to scan with the laser. Alternatively, the image display device may be a digital mirror device including a laser source, an array of micromirrors, and an actuator driving the respective micromirrors. Alternatively, the image display device may be a self-emitting display panel such as an OLED display panel. OLED is an abbreviation for Organic Light Emitting Diode.

The error detection circuit 320 of the circuit device 100 performs error detection of a distortion correction by comparing the input image data IMA to the output image data IMB. The error detection of the distortion correction is to detect whether or not the distortion correction in the distortion correction circuit 110 is normally performed. Note that "normally" here is not limited to a case where the distortion correction is performed without an error of only one bit, but includes a case where the input image data IMA and the output image data IMB substantially coincide with each other to the degree that the input image and the display image of the HUD may be regarded as substantially the same images.

Figure 3:
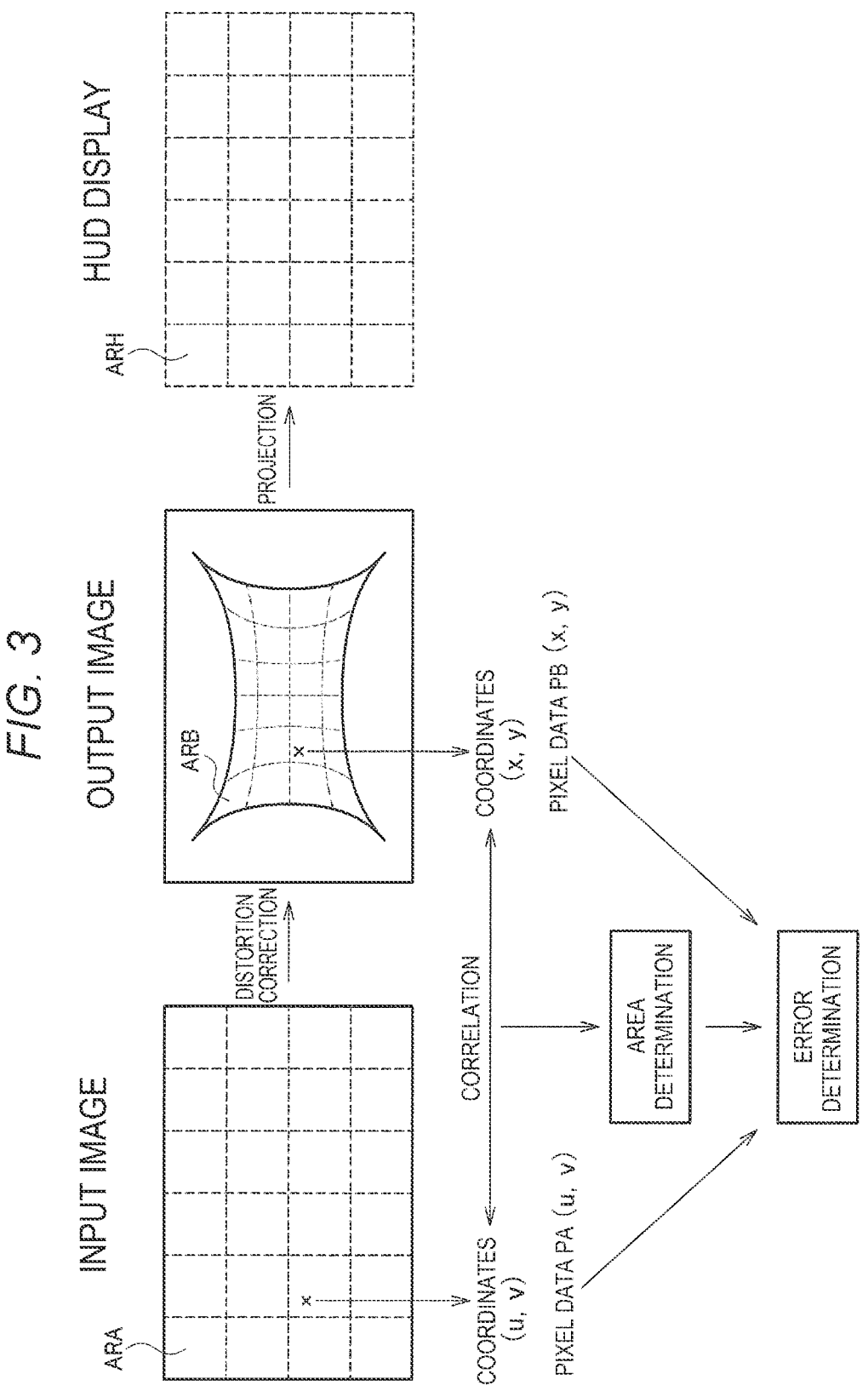
FIG. 3 is a diagram for explanation of an operation of an error detection circuit.

FIG. 3 is a diagram for explanation of an operation of the error detection circuit 320. The error detection circuit 320 includes an area determination unit 321 and an error determination unit 322. Note that dashed lines show divisional areas, but are not actually displayed.

As shown in FIG. 3, the area determination unit 321 sets a first divisional area group formed by division of an input image. The respective first divisional areas of the first divisional area group are shown by ARA. Specifically, the divisional areas are set by a plurality of straight lines in horizontal scanning directions and a plurality of straight lines in vertical directions. The circuit device 100 includes an area setting register (not shown), the processing device 200 writes setting information of the first divisional area group in the area setting register, and the area determination unit 321 sets the first divisional area group based on the setting information. Note that FIG. 3 shows an example of 6×4 divisions of the image, however, the number of divisions is not limited to that. Further, FIG. 3 shows an example of equal division of the image in the horizontal directions and the vertical directions, however, the image may be unequally divided. For example, the image may be finely divided in the vertical directions in the upper part of the screen or finely divided in the center part in the horizontal directions.

The input image is HUD-projected after the distortion correction in the reverse direction to the distortion by HUD projection, and display without distortion like the input image is obtained. That is, setting the first divisional area group in the input image is equivalent to setting a divisional area group in the HUD display. The divisional area group in the HUD display is referred to as "third divisional area group" and the respective third divisional areas are shown by ARH. The shape of the third divisional area ARH is the same as that of the first divisional area ARA corresponding to the third divisional area ARH. Coordinates (u,v) on the input image are correlated with coordinates (x,y) on the output image by coordinate transformation of the distortion correction. The output image is divided into a second divisional area group corresponding to the first divisional area group by the correlation of the coordinates. The respective second divisional areas of the second divisional area group are shown by ARB. The second divisional area ARB has a shape distorted by the distortion correction.

As described above, the respective first divisional areas ARA of the input image, the respective second divisional areas ARB of the output image, and the respective third divisional areas ARH of the HUD display are correlated with one another. Thereby, the error detection circuit 320 may detect an error of the distortion correction with respect to each third divisional area ARH of the HUD display by comparing the input image data IMA of the first divisional area ARA to the output image data IMB of the second divisional area ARB corresponding to the first divisional area ARA.

Specifically, the area determination unit 321 determines the first divisional area ARA of the first divisional area group to which the coordinates (u,v) on the input image corresponding to the coordinates (x,y) on the output image belong. When the plurality of coordinates (u,v) corresponding to the plurality of coordinates (x,y) belong to the same first divisional area ARA, the area determination unit 321 judges that the plurality of coordinates (x,y) belong to the same second divisional area ARB. In this manner, the second divisional area ARB of the output image corresponding to the first divisional area ARA set in the input image is judged. The pixel data of the input image data IMA at the coordinates (u,v) is referred to as PA(u,v), and the pixel data of the output image data IMB at the coordinates (x,y) is referred to as PB(x,y). The error determination unit 322 determines whether or not a distortion correction error occurs in the second divisional area ARB from the pixel data PA(u,v) belonging to the first divisional area ARA and the pixel data PB(x,y) belonging to the second divisional area ARB corresponding to the first divisional area ARA. The error determination unit 322 executes the error determination on the respective second divisional areas ARB.

In the above described embodiment, the circuit device 100 is used for the head-up display apparatus 50. The circuit device 100 includes the distortion correction circuit 110 and the error detection circuit 320. The distortion correction circuit 110 performs the distortion correction on the input image data IMA as the image data of the input image and outputs the output image data IMB as the image data of the output image after the distortion correction. The respective first divisional areas ARA of the first divisional area group formed by division of the input image correspond to the respective second divisional areas ARB of the second divisional area group in the output image in the distortion correction. Here, the error detection circuit 320 may perform detection of the distortion correction errors of the respective second divisional areas ARB by comparing the input image data IMA of the respective first divisional areas ARA to the output image data IMB of the respective second divisional areas ARB.

According to the embodiment, when a distortion correction error occurs in a part of an image, an area where the error occurs may be detected. Specifically, by comparison between the input image data IMA of the respective first divisional areas ARA and the output image data IMB of the respective second divisional areas ARB, the first divisional area ARA and the second divisional area ARB at a lower degree of coincidence is detected as an area where a distortion correction error occurs. Thereby, the processing of dealing with an error can be performed only on the area where the distortion correction error is detected. For example, as will be described later with reference to FIGS. 9 to 11, the processing device 200 transparently displays the area determined as having the distortion correction error not to display the image in the area where the distortion correction error occurs and maintains the HUD display in the other areas, and the information presentation to the user may be continued.

Further, according to the embodiment, the output image is a distorted image due to the distortion correction, and the first divisional area group is set in the undistorted input image. Here, the respective first divisional areas ARA of the first divisional area group formed by division of the input image correspond to the respective second divisional areas ARB of the second divisional area group in the output image in the distortion correction, and the error detection circuit 320 may compare the input image data IMA of the respective first divisional areas ARA to the output image data IMB of the respective second divisional areas ARB using the correlations.

Further, in the embodiment, the error detection circuit 320 determines correlations between the respective first divisional areas ARA and the respective second divisional areas ARB based on correlation information between coordinates GZA=(u,v) on the input image and coordinates GZB=(x,y) on the output image correlated by the distortion correction.

According to the embodiment, coordinate transformation between the coordinates GZA=(u,v) on the input image and the coordinates GZB=(x,y) on the output image is performed in the coordinate transformation of the distortion correction. The error detection circuit 320 may determine the first divisional area ARA to which the coordinates GZA=(u,v) on the input image corresponding to the coordinates GZB=(x,y) on the output image belong using the correlation. Thereby, the first divisional area ARA on the input image is correlated with the second divisional area ARB on the output image.

2. Detailed Configuration Example of Error Determination Unit

Figure 4:
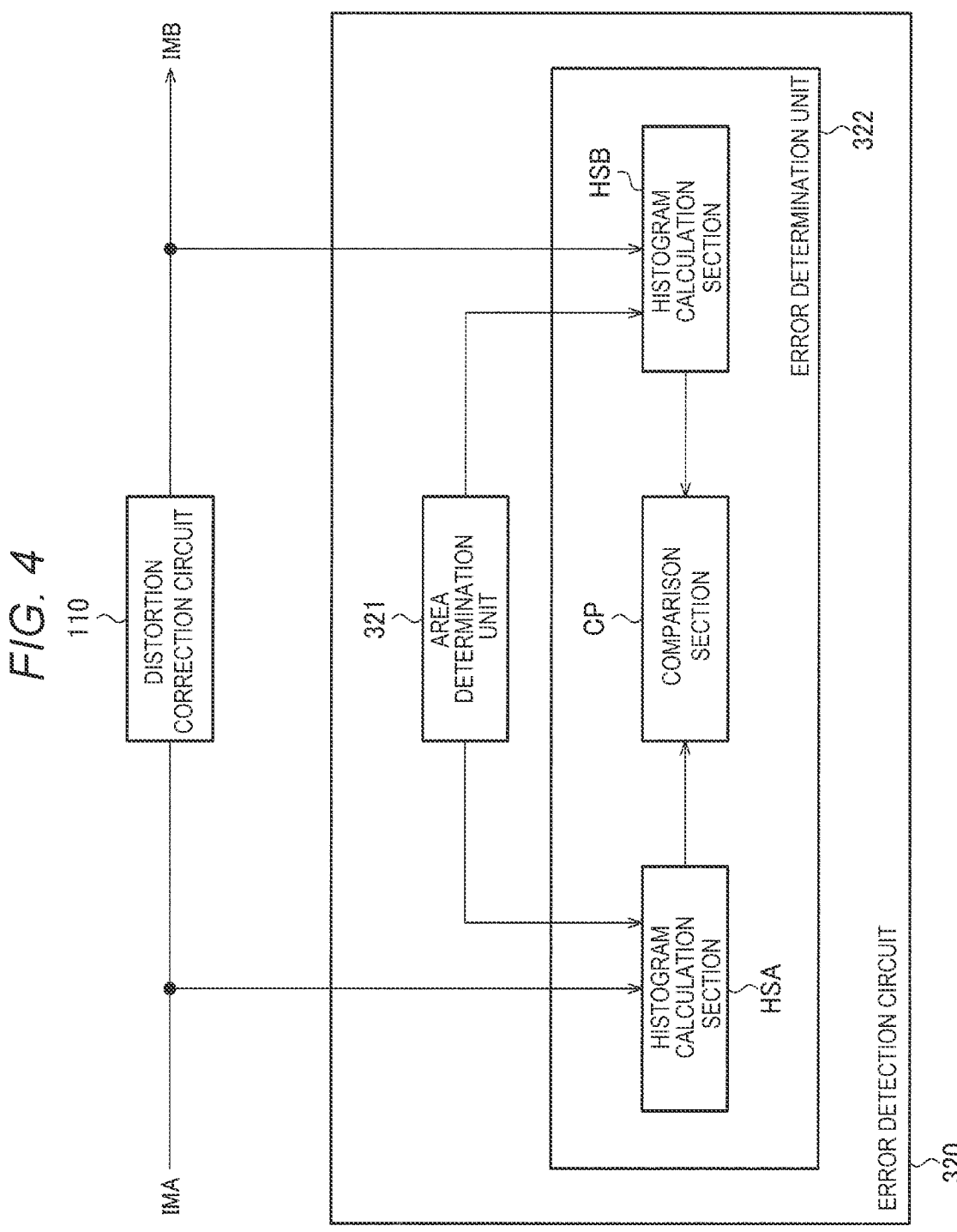
FIG. 4 shows a detailed configuration example of an error determination unit.

FIG. 4 shows a detailed configuration example of the error determination unit 322. The error determination unit 322 includes a histogram calculation section HSA, a histogram calculation section HSB, and a comparison section CP.

Figure 5:
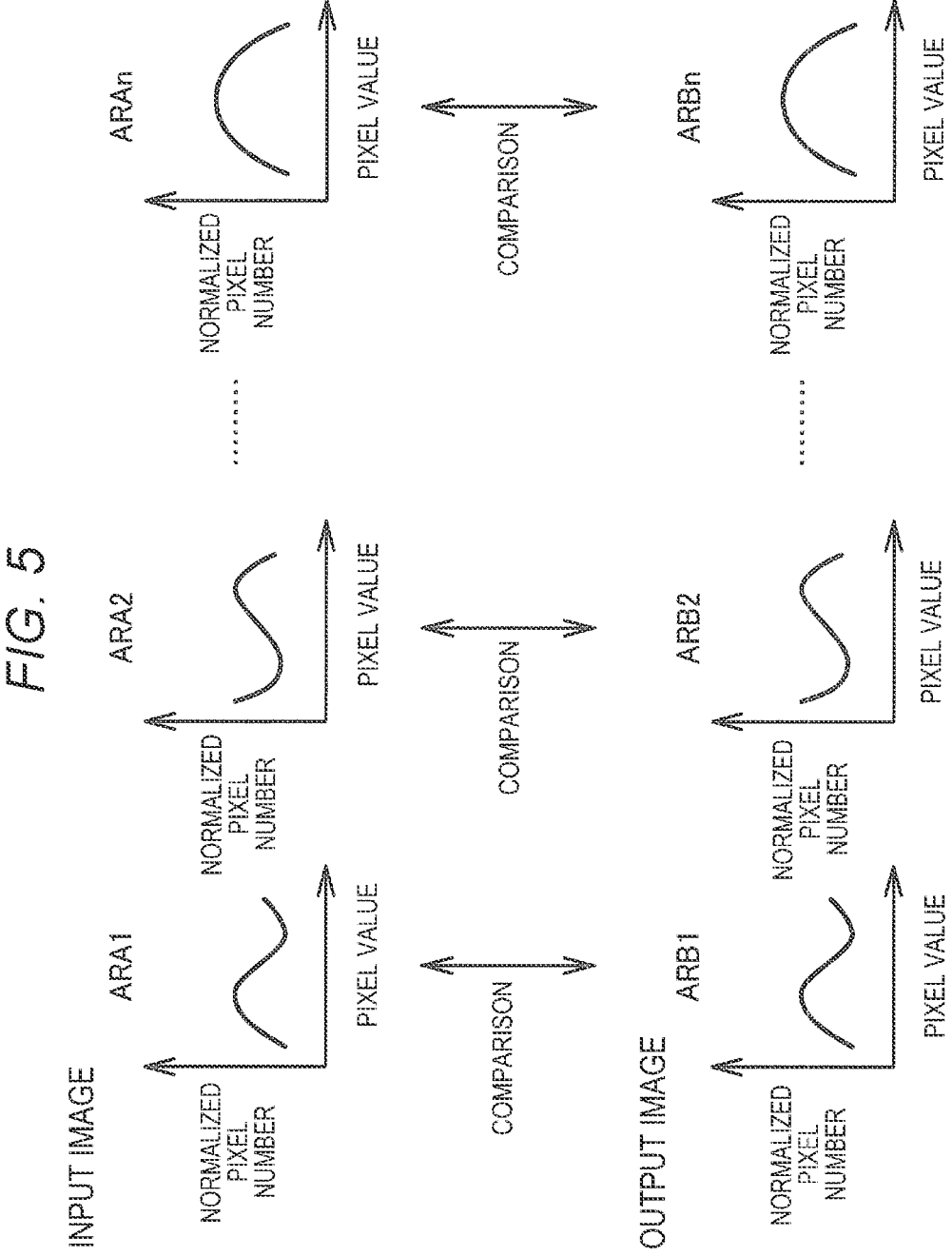
FIG. 5 is a diagram for explanation of an operation of the error determination unit.

FIG. 5 is a diagram for explanation of an operation of the error determination unit 322. Here, n first divisional areas ARA1 to ARAn are set in the input image. The second divisional area corresponding to the first divisional area ARAk is shown by ARBk. n is an integer equal to or larger than 2 and k is an integer equal to or larger than 1 and equal to or less than n.

The histogram calculation section HSA calculates a histogram from the input image data IMA of the first divisional area ARAk. The histogram shows a normalized pixel number having respective pixel values. The normalized pixel number is obtained by division of a pixel number having respective pixel values by a total pixel number of the first divisional area ARAk. FIG. 5 shows a single histogram for the first divisional area ARAk, however, the histogram calculation section HSA obtains a histogram of R pixel values, a histogram of G pixel values, and a histogram of B pixel values.

The histogram calculation section HSB calculates a histogram from the output image data IMB of the second divisional area ARBk. The normalized pixel number is obtained by division of a pixel number having respective pixel values by a total pixel number of the second divisional area ARBk. FIG. 5 shows a single histogram for the second divisional area ARBk, however, the histogram calculation section HSB obtains a histogram of R pixel values, a histogram of G pixel values, and a histogram of B pixel values.

The comparison section CP compares the histogram of the first divisional area ARAk to the histogram of the second divisional area ARBk. The comparison section CP judges that an error occurs in the distortion correction of the second divisional area ARBk when the histogram of the first divisional area ARAk and the histogram of the second divisional area ARBk are not the same. Note that the histograms being the same includes histograms being substantially the same.

Specifically, the comparison section CP obtains differences between the histogram of the R pixel values, the histogram of the G pixel values, and the histogram of the B pixel values of the first divisional area ARAk and the histogram of the R pixel values, the histogram of the G pixel values, and the histogram of the B pixel values of the second divisional area ARBk. The following expression (1) shows a mathematical expression for obtaining a difference SADk.

$$SADk = \sum_{i=0}^{15}|ARAk\_rbin(i) - ARBk\_rbin(i)| + \tag{1}$$

$$\sum_{i=0}^{15}|ARAk\_gbin(i) - ARBk\_gbin(i)| +$$

$$\sum_{i=0}^{15}|ARAk\_bbin(i) - ARBk\_bbin(i)|$$

In the above expression (1), ARAk_rbin(i) shows a normalized pixel number of a pixel value i in the histogram of the R pixel values of the first divisional area ARAk. Here, i is an integer from 0 to 15. ARBk_rbin(i) shows a normalized pixel number of the pixel value i in the histogram of the R pixel values of the second divisional area ARBk. ARAk_gbin(i) shows a normalized pixel number of the pixel value i in the histogram of the G pixel values of the first divisional area ARAk. ARBk_gbin(i) shows a normalized pixel number of the pixel value i in the histogram of the G pixel values of the second divisional area ARBk. ARAk_bbin(i) shows a normalized pixel number of the pixel value i in the histogram of the B pixel values of the first divisional area ARAk. ARBk_bbin(i) shows a normalized pixel number of the pixel value i in the histogram of the B pixel values of the second divisional area ARBk.

The comparison section CP compares the difference SADk to a threshold and, when the difference SADk is larger than the threshold, determines that a distortion correction error occurs in the second divisional area ARB. SADk in the above expression (1) is a real number from 0 to 6 and, when the histograms completely coincide, SADk=0, and the degree of coincidence of the histograms is higher as SADk is closer to 0. The threshold is set according to the required degree of coincidence of the histograms. For example, the processing device 200 writes the threshold in a register (not shown) provided in the circuit device 100 and the comparison section CP compares the threshold to the difference SADk.

In the above described embodiment, the error detection circuit 320 performs detection of the distortion correction error by comparing the histograms of the pixel values of the input image data IMA in the respective first divisional areas ARA to the histograms of the pixel values of the output image data IMB in the respective second divisional areas ARB.

When the distortion correction error occurs in the second divisional area ARB, the histogram of the second divisional area ARB and the histogram of the first divisional area ARA corresponding thereto do not coincide. According to the embodiment, the histograms of the respective first divisional areas ARA are compared to the histograms of the respective second divisional areas ARB, and thereby, the area where the histograms do not coincide may be judged as having the distortion correction error. Note that, as described above, the coincidence here is not limited to a complete coincidence.

Further, in the embodiment, the error detection circuit 320 performs detection of the distortion correction error by comparing the histograms of the R pixel values, the histograms of the G pixel values, and the histograms of the B pixel values of the input image data IMA in the respective first divisional areas ARA to the histograms of the R pixel values, the histograms of the G pixel values, and the histograms of the B pixel values of the output image data IMB in the respective second divisional areas ARB.

According to the embodiment, the input image data IMA is compared to the output image data IMB using the respective RGB histograms, and thereby, accurate error detection can be performed. For example, compared to a case where histograms of luminance values are used, the respective RGB histograms are used and the histograms are compared including information not only of luminance but also colors.

Furthermore, in the embodiment, the error detection circuit 320 normalizes the histograms of the pixel values of the input image data IMA in the respective first divisional areas ARA by the pixel numbers of the respective first divisional areas ARA and normalizes the histograms of the pixel values of the output image data IMB in the respective second divisional areas ARB by the pixel numbers of the respective second divisional areas ARB. The error detection circuit 320 performs the detection of the distortion correction error by comparing the normalized histogram of the pixel values of the input image data IMA to the normalized histogram of the pixel values of the output image data IMB.

The output image data IMB is image data after the distortion correction, and the shape of the second divisional area ARB in the output image is different from the shape of the first divisional area ARA set for the input image. Accordingly, the pixel number of the first divisional area ARA and the pixel number of the second divisional area ARB are different. According to the embodiment, the histograms are normalized by the pixel numbers of the divisional areas, and thereby, the histograms can be compared before and after the distortion correction.

3. First to Third Detailed Configuration Examples of Circuit Device

Figure 6:
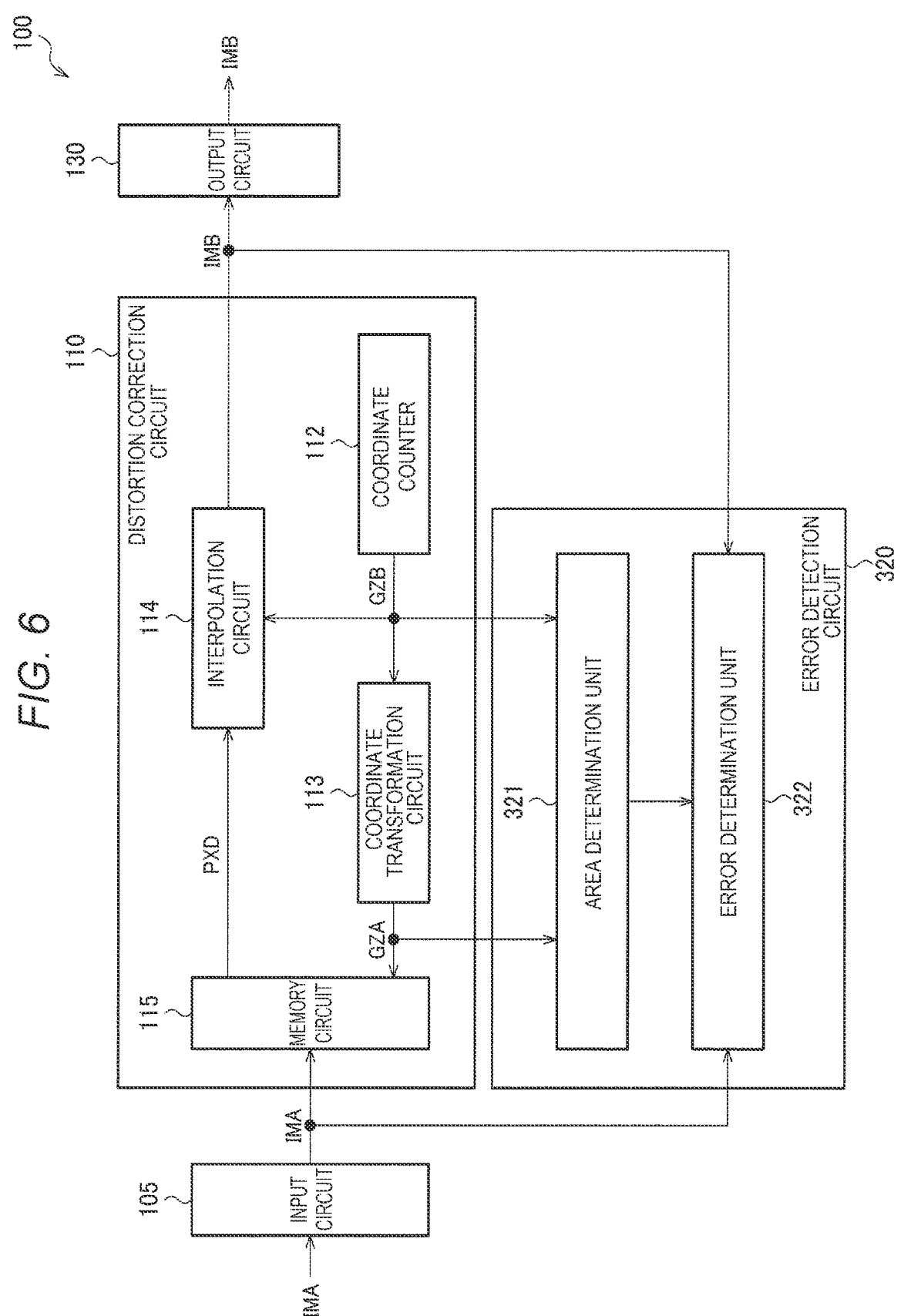
FIG. 6 shows a first detailed configuration example of the circuit device.

FIG. 6 shows a first detailed configuration example of the circuit device 100. In FIG. 6, the distortion correction circuit 110 includes a coordinate counter 112, a coordinate transformation circuit 113, an interpolation circuit 114, and a memory circuit 115. Here, an example in which the distortion correction circuit 110 is a reverse warp engine is explained.

The coordinate counter 112 outputs the pixel coordinates GZB=(x,y) on the output image data IMB. The coordinate transformation circuit 113 transforms the pixel coordinates (x,y) into reference coordinates GZA=(u,v) on the input image data IMA. The memory circuit 115 temporarily stores the input image data IMA and outputs pixel data PXD of the reference coordinates (u,v). Specifically, the coordinate transformation circuit 113 transforms the reference coordinates (u,v) into a read address and the memory circuit 115 reads out the pixel data PXD of the reference coordinates (u,v) from the read address. More specifically, the coordinate transformation circuit 113 outputs the read addresses of the plurality of pixels around the reference coordinates (u,v) and the memory circuit 115 reads out the pixel data of the plurality of pixels. The interpolation circuit 114 performs interpolation processing on the plurality of pixel data read out in correlations with the reference coordinates (u,v) and obtains the pixel data of the pixel coordinates (x,y) in the output image data IMB.

The area determination unit 321 of the error detection circuit 320 determines the first divisional area ARA to which the reference coordinates GZA=(u,v) on the input image data IMA belong and determines the second divisional area ARB to which the pixel coordinates (x,y) on the output image data IMB belong.

The error determination unit 322 determines whether or not distortion correction errors occur in the respective second divisional areas ARB by calculating histograms from the input image data IMA of the respective first divisional areas ARA and calculating histograms from the output image data IMB of the respective second divisional areas ARB based on an area determination result, and comparing the histograms.

Figure 7:
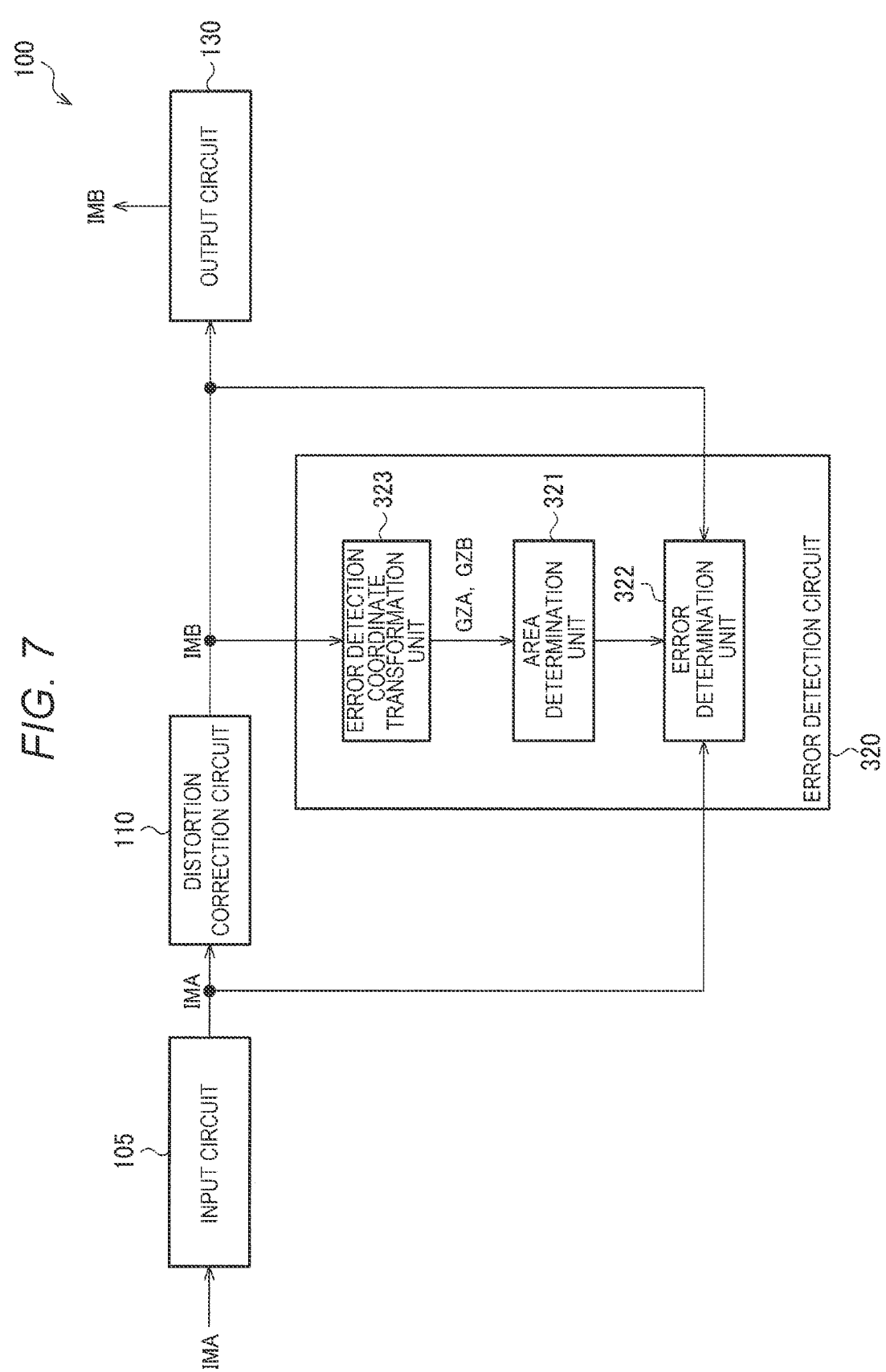
FIG. 7 shows a second detailed configuration example of the circuit device.

FIG. 7 shows a second detailed configuration example of the circuit device 100. In FIG. 7, the error detection circuit 320 includes the area determination unit 321, the error determination unit 322, and an error detection coordinate transformation unit 323.

The error detection coordinate transformation unit 323 transforms the coordinates GZB (x,y) on the output image data IMB into coordinates GZA=(u,v) on the input image data IMA. The area determination unit 321 determines the first divisional area ARA to which the coordinates GZA on the input image data IMA belong based on the coordinates GZA, GZB from the error detection coordinate transformation unit 323 and determines the second divisional area ARB to which the coordinates GZB on the output image data IMB belong. The error determination unit 322 determines whether or not distortion correction errors occur in the respective second divisional areas ARB by calculating histograms from the input image data IMA of the respective first divisional areas ARA and calculating histograms from the output image data IMB of the respective second divisional areas ARB based on an area determination result, and comparing the histograms.

Figure 8:
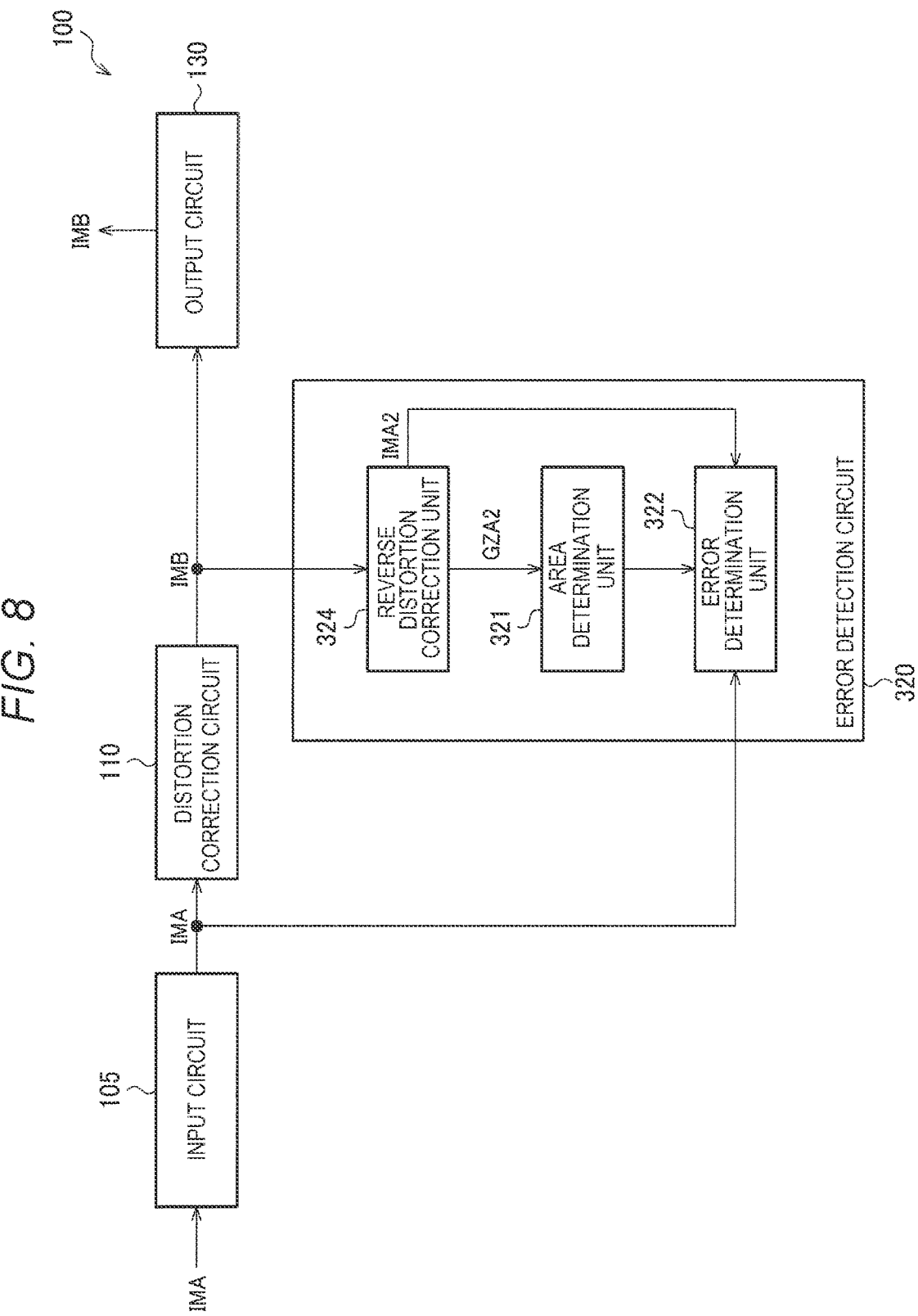
FIG. 8 shows a third detailed configuration example of the circuit device.

FIG. 8 shows a third detailed configuration example of the circuit device 100. In FIG. 8, the error detection circuit 320 includes the area determination unit 321, the error determination unit 322, and a reverse distortion correction unit 324.

The reverse distortion correction unit 324 generates second input image data IMA2 by performing a reverse distortion correction as a reverse correction to the distortion correction performed by the distortion correction circuit 110 on the output image data IMB. When the reverse distortion correction is a complete reverse correction, the second input image data IMA2 coincide with the input image data IMA. Note that the reverse distortion correction may not be a complete reverse correction due to interpolation processing or the like, and the second input image data IMA2 may be substantially the same as the input image data IMA. The area determination unit 321 determines the first divisional area ARA to which coordinates GZA2 on the second input image data IMA2 belong. The error determination unit 322 calculates histograms from the input image data IMA of the respective first divisional areas ARA and calculates histograms from the second input image data IMA2 of the respective first divisional areas ARA based on an area determination result, and compares the histograms. The error determination unit 322 determines whether or not distortion correction errors occur in the respective first divisional areas ARA, and thereby, determines whether or not distortion correction errors occur in the respective second divisional areas ARB corresponding thereto.

In the above described embodiment, the circuit device 100 includes an interrupt signal generation circuit 170 generating an interrupt signal IRQ when the error detection circuit 320 detects the distortion correction error.

According to the embodiment, when the error detection circuit 320 detects the distortion correction error, the external processing device 200 may be informed of the occurrence of the distortion correction error by the interrupt signal generation circuit 170 generating the interrupt signal IRQ.

Further, in the embodiment, the circuit device 100 includes a status register 160 storing the information representing the second divisional area ARB where the distortion correction error is detected of the second divisional area group.

According to the embodiment, when the detection circuit 320 detects the distortion correction error, the status register 160 may store the information representing the second divisional area ARB where the distortion correction error is detected of the second divisional area group. For example, the external processing device 200 accesses the status register 160, and thereby, may grasp the second divisional area ARB where the distortion correction error occurs, i.e., the first divisional area ARA where the distortion correction error occurs.

4. Fourth Detailed Configuration Example of Circuit Device

Figure 9:
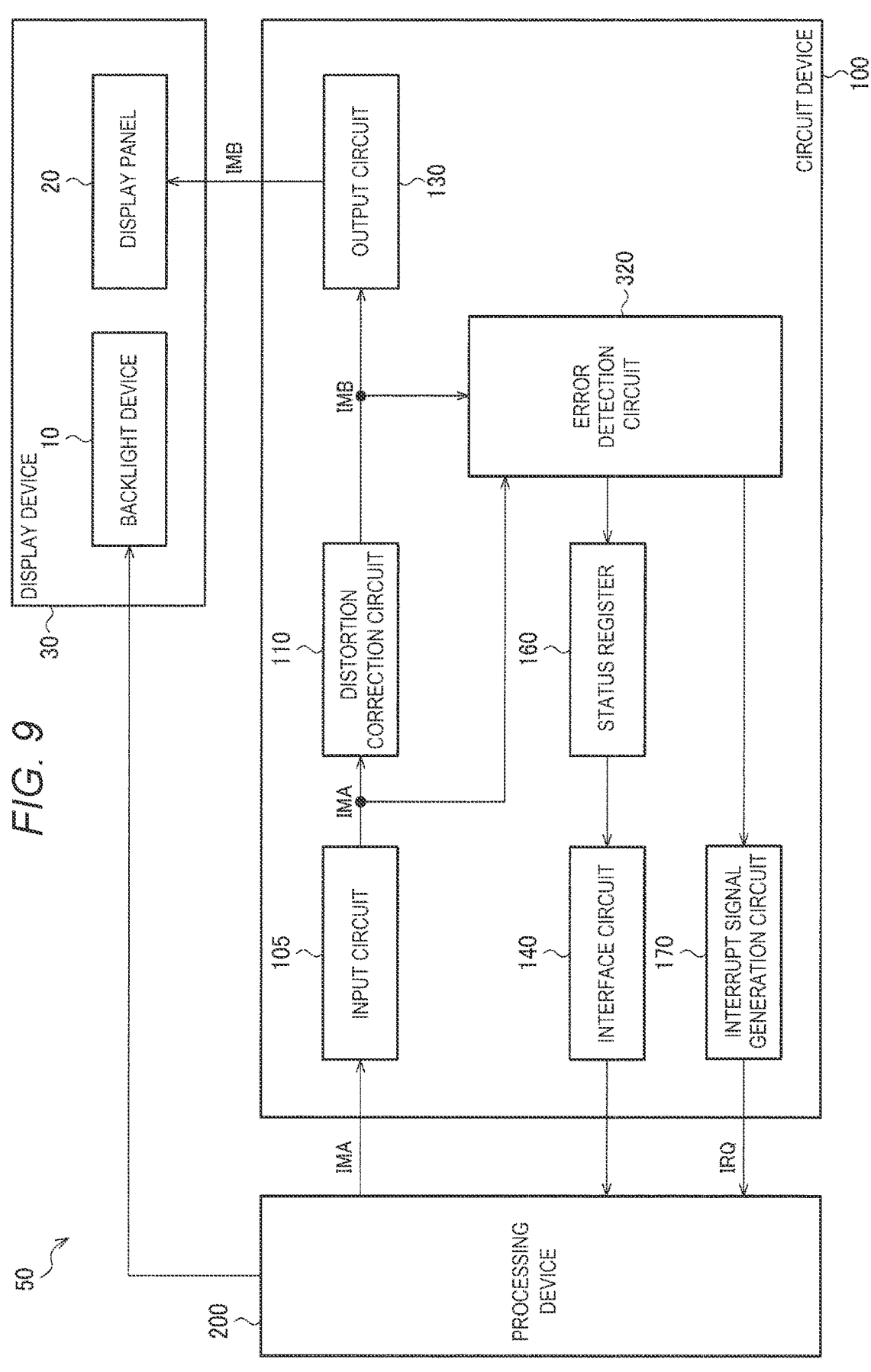
FIG. 9 shows a fourth detailed configuration example of the circuit device and a detailed configuration example of a display device.

FIG. 9 shows a fourth detailed configuration example of the circuit device 100 and a detailed configuration example of the display device 30 when the circuit device 100 of the fourth detailed configuration example is used. The circuit device 100 of the fourth detailed configuration example can be combined with any one of the above described first to third detailed configuration examples.

The display device 30 includes a display panel 20 and a backlight device 10. The display panel 20 is a liquid crystal display panel. The backlight device 10 is a device radiating backlight to the liquid crystal display panel. The processing device 200 controls turning on and off of the backlight device 10 and controls dimming of the backlight device 10.

The circuit device 100 includes the input circuit 105, the distortion correction circuit 110, the error detection circuit 320, the output circuit 130, an interface circuit 140, the status register 160, and the interrupt signal generation circuit 170.

The interface circuit 140 is a communication interface for the processing device 200 to communicate with the circuit device 100. The interface circuit 140 is a serial interface of e.g. an SPI standard or an I2C standard. SPI is an abbreviation for Serial Peripheral Interface, and I2C is an abbreviation for Inter-Integrated Circuit.

The error detection circuit 320 writes the information representing the second divisional area ARB where the distortion correction error is detected of the second divisional area group in the status register 160. The information representing the second divisional area ARB where the distortion correction error is detected may be information representing the first divisional area ARA corresponding to the second divisional area ARB where the distortion correction error is detected.

The interrupt signal generation circuit 170 outputs the interrupt signal IRQ to the processing device 200 when the error detection circuit 320 detects the distortion correction error. Specifically, when the distortion correction errors are detected from one or more second divisional areas of the second divisional area group, the interrupt signal generation circuit 170 outputs the interrupt signal IRQ to the processing device 200.

When receiving the interrupt signal IRQ, the processing device 200 performs processing of dealing with the distortion correction error. For example, the processing device 200 may turn off the backlight device of the display device 30 or stop transmission of the input image data IMA when receiving the interrupt signal IRQ. Alternatively, when receiving the interrupt signal IRQ, the processing device 200 acquires the information representing the second divisional area ARB where the distortion correction error is detected from the status register 160 via the interface circuit 140. The processing device 200 performs processing of dealing with the distortion correction error based on the acquired information with respect to each area. As below, examples of the processing will be explained.

Figure 10:
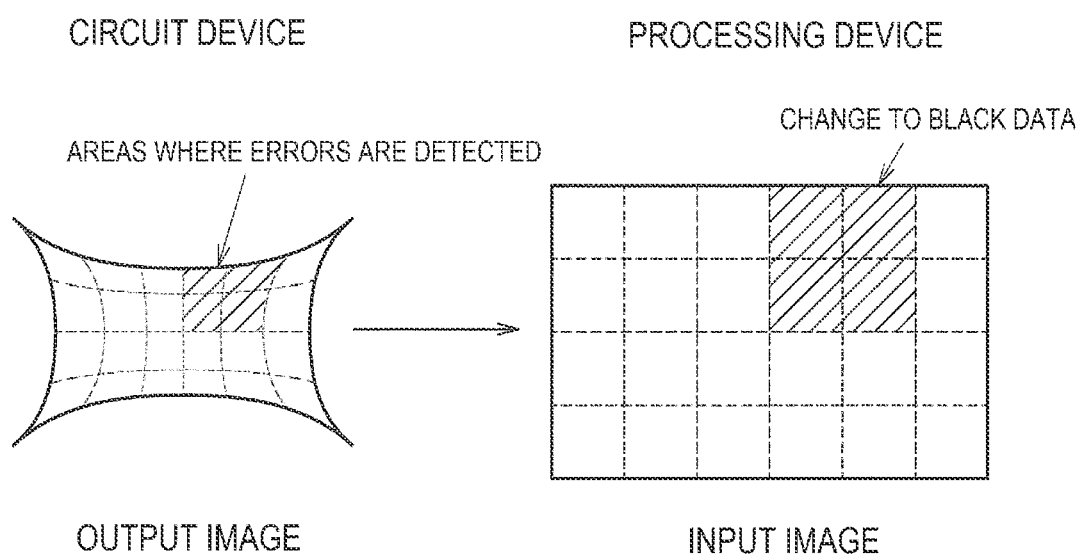
FIG. 10 shows a first example of processing of dealing with a distortion correction error with respect to each area.

FIG. 10 shows a first example of processing of dealing with the distortion correction error with respect to each area. The processing device 200 transmits input image data IMA in which the first divisional area ARA corresponding to the second divisional area ARB where the distortion correction error is detected is set to black data to the circuit device 100. In the HUD display based on the input image data IMA, the third divisional area ARH corresponding to the first divisional area ARA of the black data is transparently displayed.

Figure 11:
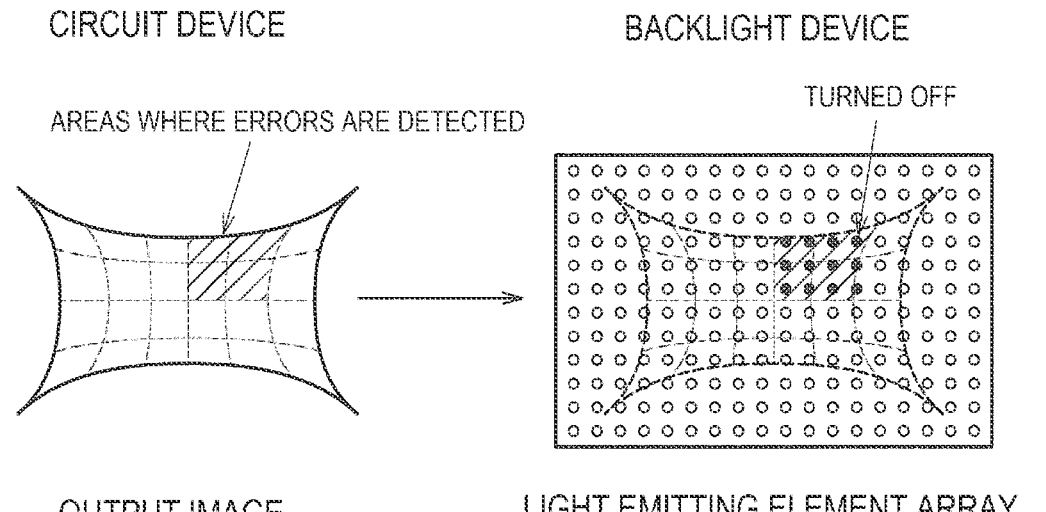
FIG. 11 shows a second example of the processing of dealing with the distortion correction error with respect to each area.

FIG. 11 shows a second example of the processing of dealing with the distortion correction error with respect to each area. As shown in the right part of FIG. 11, the backlight device includes a light emitting element array and the light emitting element array includes a plurality of light emitting elements arranged in an array form. Each light emitting element is a light emitting element that can be controlled to be independently turned on or off such as an LED. LED is an abbreviation for Light Emitting Diode. The plurality of light emitting elements are arranged so that, when all of the elements are turned on, the display area of the display panel 20 may be illuminated substantially uniformly. The processing device 200 turns off the light emitting elements illuminating the second divisional area ARB where the distortion correction error is detected and turns on the other light emitting elements of the light emitting element array. In the right part of FIG. 11, the turned-off light emitting elements are shown by black circles and the turned-on light emitting elements are shown by white circles. Thereby, the third divisional area ARH on the HUD display corresponding to the second divisional area ARB where the distortion correction error is detected is transparent.

In the above described embodiment, the display device 30 includes the display panel 20 and the backlight device 10 for the display panel 20. The processing device 200 controls the backlight device 10 based on the detection result of the distortion correction error.

According to the embodiment, the processing device 200 may execute the processing of dealing with an error based on the detection result of the distortion correction error output by the circuit device 100. For example, the processing device 200 may turn off the backlight device 10 when the distortion correction error occurs in one or more second divisional areas of the second divisional area group. Alternatively, when the backlight device has the light emitting element array, the processing device 200 may turn off the light emitting elements corresponding to the second divisional area where the distortion correction error occurs.

The circuit device of the above described embodiment is used for the head-up display apparatus. The circuit device includes the distortion correction circuit and the error detection circuit. The distortion correction circuit performs the distortion correction on the input image data as the image data of the input image and outputs the output image data as the image data of the output image after the distortion correction. When the respective first divisional areas of the first divisional area group formed by division of the input image correspond to the respective second divisional areas of the second divisional area group in the output image in the distortion correction, the error detection circuit performs detection of the distortion correction error of the respective second divisional areas by comparing the input image data of the respective first divisional areas to the output image data of the respective second divisional areas.

According to the embodiment, when the distortion correction error occurs in a part of an image, the area where the error occurs may be detected. Specifically, by comparison between the input image data of the respective first divisional areas and the output image data of the respective second divisional areas, the first divisional area and the second divisional area at a lower degree of coincidence is detected as the area where the distortion correction error occurs. Further, according to the embodiment, the output image is a distorted image due to the distortion correction, and the first divisional area group is set in the undistorted input image. Here, the respective first divisional areas of the first divisional area group formed by division of the input image correspond to the respective second divisional areas of the second divisional area group in the output image in the distortion correction, and the error detection circuit may compare the input image data of the respective first divisional areas to the output image data of the respective second divisional areas using the correlations.

Further, in the embodiment, the error detection circuit may determine correlations between the respective first divisional areas and the respective second divisional areas based on the correlation information between the coordinates on the input image and the coordinates on the output image correlated by the distortion correction.

According to the embodiment, the coordinate transformation between the coordinates on the input image and the coordinates on the output image is performed in the coordinate transformation of the distortion correction. The error detection circuit may determine the first divisional area to which the coordinates on the input image corresponding to the coordinates on the output image belong using the correlations. Thereby, the first divisional areas on the input image and the second divisional areas on the output image are correlated.

Furthermore, in the embodiment, the error detection circuit may perform detection of the distortion correction error by comparing the histograms of the pixel values of the input image data in the respective first divisional areas to the histograms of the pixel values of the output image data in the respective second divisional areas.

When the distortion correction error occurs in the second divisional area, the histogram of the second divisional area and the histogram of the first divisional area corresponding thereto do not coincide. According to the embodiment, the histograms of the respective first divisional areas are compared to the histograms of the respective second divisional areas, and thereby, the area where the histograms do not coincide may be judged as having the distortion correction error.

In the embodiment, the error detection circuit may perform detection of the distortion correction error by comparing the histograms of the R pixel values, the histograms of the G pixel values, and the histograms of the B pixel values of the input image data in the respective first divisional areas to the histograms of the R pixel values, the histograms of the G pixel values, and the histograms of the B pixel values of the output image data in the respective second divisional areas.

According to the embodiment, the input image data is compared to the output image data using the respective RGB histograms, and thereby, accurate error detection can be performed. For example, compared to a case where histograms of luminance values are used, the respective RGB histograms are used and the histograms are compared including information not only of luminance but also colors.

Furthermore, in the embodiment, the error detection circuit may normalize the histograms of the pixel values of the input image data in the respective first divisional areas by the pixel numbers of the respective first divisional areas and normalize the histograms of the pixel values of the output image data in the respective second divisional areas by the pixel numbers of the respective second divisional areas. The error detection circuit may perform the detection of the distortion correction error by comparing the normalized histogram of the pixel values of the input image data to the normalized histogram of the pixel values of the output image data.

The output image data is image data after the distortion correction, and the shape of the second divisional area in the output image is different from the shape of the first divisional area set for the input image. Accordingly, the pixel number of the first divisional area ARA and the pixel number of the second divisional area are different. According to the embodiment, the histograms are normalized by the pixel numbers of the divisional areas, and thereby, the histograms can be compared before and after the distortion correction.

In the embodiment, the circuit device may include the interrupt signal generation circuit generating the interrupt signal when the distortion correction error is detected by the error detection circuit.

According to the embodiment, when the distortion correction error is detected by the error detection circuit, the interrupt signal generation circuit generates the interrupt signal, and thereby, the external processing device may be informed of the occurrence of the distortion correction error.

Further, in the embodiment, the circuit device may include the status register storing the information representing the second divisional area where the distortion correction error is detected of the second divisional area group.

According to the embodiment, when the distortion correction error is detected by the error detection circuit, the status register may store the information representing the second divisional area where the distortion correction error is detected of the second divisional area group. For example, the external processing device accesses the status register, and thereby, may grasp the second divisional area where the distortion correction error occurs, i.e., the first divisional area where the distortion correction error occurs.

The head-up display apparatus of the embodiment includes the circuit device according to one of the above described circuit devices, the processing device controlling the circuit device, and the display device projecting the display image based on the output image data from the circuit device.

In the embodiment, the display device may include the display panel and the backlight device for the display panel. The processing device may control the backlight device based on the detection result of the distortion correction error.

According to the embodiment, the processing device may execute the processing of dealing with an error based on the detection result of the distortion correction error output by the circuit device. For example, the processing device may turn off the backlight device when the distortion correction error occurs in one or more second divisional areas of the second divisional area group. Alternatively, when the backlight device has the light emitting element array, the processing device may turn off the light emitting elements corresponding to the second divisional area where the distortion correction error occurs.

Note that the embodiments are explained in detail as described above, however, a person skilled in the art could easily understand that many modifications without substantively departing from the new matter and the effects of the present disclosure can be made. Therefore, the scope of the present disclosure includes all of these modified examples. For example, in the specification or the drawings, terms described with different terms in a broader sense or synonymous at least once may be replaced by the different terms in any part of the specification or the drawings. Further, the scope of the present disclosure includes all combinations of the embodiments and modified examples. Furthermore, the configurations, the operations, etc. of the circuit device, the head-up display apparatus, the processing device, the display system, etc. are not limited to those explained in the embodiments, but various modifications can be made.

What is claimed is:

1. A circuit device used for a head-up display apparatus, comprising:

an input interface configured to receive input image data of an input image; and a logic circuit configured to:

perform a distortion correction on the input image data to generate distortion-corrected output image data of an output image;

divide the input image, which is not distortion-corrected, into a plurality of first divisional areas;

divide the output image, which has been distortion-corrected, into a plurality of second divisional areas;

compare the input image data corresponding to respective first divisional areas of the plurality of first divisional areas with the distortion-corrected output image data corresponding to respective second divisional areas of the plurality of second divisional areas to generate a comparison result; and determine whether a distortion correction error occurs based on the comparison result, wherein the logic circuit is further configured to detect the distortion correction error by comparing histograms of pixel values of the input image data in the respective first divisional areas to histograms of pixel values of the output image data in the respective second divisional areas.

2. The circuit device according to claim 1, wherein the logic circuit is further configured to determine correlations between the respective first divisional areas and the respective second divisional areas based on correlation information of coordinates on the input image and coordinates on the output image correlated by the distortion correction.

3. The circuit device according to claim 1, wherein the logic circuit is further configured to detect the distortion correction error by comparing histograms of R pixel values, histograms of G pixel values, and histograms of B pixel values of the input image data in the respective first divisional areas to histograms of R pixel values, histograms of G pixel values, and histograms of B pixel values of the output image data in the respective second divisional areas.

4. The circuit device according to claim 1 wherein the logic circuit is further configured to normalize the histograms of the pixel values of the input image data in the respective first divisional areas by pixel numbers of the respective first divisional areas and normalize the histograms of the pixel values of the output image data in the respective second divisional areas by pixel numbers of the respective second divisional areas, and detect the distortion correction error by comparing the normalized histogram of the pixel values of the input image data to the normalized histogram of the pixel values of the output image data.

5. The circuit device according to claim 1, further comprising an interrupt signal generation circuit generating an interrupt signal when the distortion correction error is detected by the logic circuit.

6. The circuit device according to claim 5, further comprising a status register storing information representing the second divisional area where the distortion correction error is detected of the plurality of second divisional areas.

7. A head-up display apparatus comprising:

the circuit device according to claim 1;

a processing device controlling the circuit device; and a display device projecting a display image based on the output image data from the circuit device.

8. The head-up display apparatus according to claim 7, wherein the display device includes a display panel and a backlight device for the display panel, and the processing device controls the backlight device based on a detection result of the distortion correction error.

* * * * *